United States Patent
Knutsson et al.

(10) Patent No.: US 6,920,319 B2
(45) Date of Patent: Jul. 19, 2005

(54) METHOD AND APPARATUS FOR A MOBILE ACCESS SYSTEM DELIVERING LOCATION BASED INFORMATION AND SERVICES

(75) Inventors: Per Knutsson, Tyresö (SE); Peter Kjellerstedt, Lund (SE); Willy Sagefalk, Veberöd (SE); Mattias Ågren, Lund (SE); Mikael Pahmp, Helsingborg (SE); Jonas Dellenvall, Onsala (SE)

(73) Assignee: Axis AB, Lund (SE)

( * ) Notice: Subject to any disclaimer, the term of this patent is extended or adjusted under 35 U.S.C. 154(b) by 523 days.

(21) Appl. No.: 09/850,905

(22) Filed: May 7, 2001

(65) Prior Publication Data

US 2002/0006788 A1 Jan. 17, 2002

Related U.S. Application Data

(60) Provisional application No. 60/201,958, filed on May 5, 2000.

(51) Int. Cl.[7] .............................................. H04Q 7/20
(52) U.S. Cl. .................... 455/422; 455/404.1; 455/668; 342/457; 342/463; 342/450; 379/454
(58) Field of Search ............................ 455/422, 404.1, 455/668, 414.1, 414.2, 426.2, 456.1, 456.3; 342/457, 463, 450, 464; 379/454

(56) References Cited

U.S. PATENT DOCUMENTS 5,969,678 A * 10/1999 Stewart ....................... 342/457

| | | | | |
|---|---|---|---|---|
| 6,259,405 B1 | * | 7/2001 | Stewart et al. | 342/457 |
| 6,405,049 B2 | * | 6/2002 | Herrod et al. | 455/517 |
| 6,625,457 B1 | * | 9/2003 | Raith | 455/456.1 |
| 6,650,902 B1 | * | 11/2003 | Richton | 455/456.3 |

* cited by examiner

Primary Examiner—David Hudspeth
Assistant Examiner—Julio Perez
(74) Attorney, Agent, or Firm—IP Creators; Charles C Cary

(57) ABSTRACT

A method and apparatus is disclosed for providing a range of location dependent information and services to users of wireless devices coupled to the multi-point wireless access network of the current invention.

In an embodiment of the invention a multi-point wireless access network for servicing wireless devices is provided. The multi-point wireless access network includes: wireless access devices, an inventory map and a server. The wireless access points are arrayed in a coordinate system with a known relative relationship to one another. Each of the wireless access points provides communication capabilities for corresponding proximate ones of the wireless devices. The inventory map correlates selected ones of the wireless access points with corresponding inventory located proximate to each of the selected ones of the wireless access points. The server couples to the wireless access points and to the inventory map, and the server correlates each access to the multi-point wireless access network from a corresponding wireless device with the corresponding inventory from the inventory map to provide at least one of location dependant information and location dependant services to the corresponding wireless device.

8 Claims, 7 Drawing Sheets

METHOD AND APPARATUS FOR A MOBILE ACCESS SYSTEM DELIVERING LOCATION BASED INFORMATION AND SERVICES

CROSS-REFERENCE TO RELATED APPLICATION

This application claims priority from Provisional Application No.: 60/201,958 entitled "WIRELESS ACCESS POINT" filed on May 5, 2000 which is incorporated herein by reference in their entirety.

NOTICE REGARDING COPYRIGHTED MATERIAL

A portion of the disclosure of this patent document contains material which is subject to copyright protection. The copyright owner has no objection to the facsimile reproduction by any one of the patent document or the patent disclosure as it appears in the public Patent Trademark Office file or records, but otherwise reserves all copyright rights whatsoever.

BACKGROUND OF THE INVENTION

1. Field of the Invention

The invention relates to local area networks and particularly to wireless local area network having distributed control and supporting roaming of mobile units in terms of their contact with mobile access points.

2. Description of the Related Art

The future of the Internet is increasingly wireless, and includes devices that go beyond today's personal computers. These include personal digital assistants (PDAs), and browser-equipped mobile telephones. There are two competing approaches to providing the power of the Internet to these wireless devices. The first of these approaches advanced by the telecommunications industry is called "third generation" (3G) mobile networks. Defined by the International Telecommunications Union (ITU) standards body, 3G provides a global framework for high-speed, high-quality, integrated, mobile digital data and voice communications. Carriers have already paid tens of billions of dollars for licenses to the frequencies reserved for 3G services, and these fees are unlikely to fall far for future licensees. Such figures mean that 3G licenses will be beyond the reach of small, innovative and emerging carriers and service providers. Not only must the 3G carriers recoup their multi-billion-dollar license investments, but they must face additional technological challenges including: limited spectrum, and the need for additional infrastructure investment for many smaller "cells" in the carrier network to support high-speed data traffic.

The second approach relies on unlicensed portions of the radio frequency spectrum. These include 5 GHz alternatives such as HyperLAN/2 and 802.11a industry standards, as well as current 2.4 GHz technologies such as Bluetooth® Telefonaktiebolaget LM Ericsson, Sweden and 802.11b. These standards are specifically designed to allow cable-free connections among small, often handheld, low-power devices. These technologies operate at radio frequencies that are not bound by the regulatory and commercial structures. This parallels the open, accessible and entrepreneurial nature of the Internet itself, significantly lowering market entry costs and creating numerous opportunities for mobile Internet services providers.

What is needed are more flexible ways of coupling wireless devices to the Internet.

SUMMARY OF THE INVENTION

A method and apparatus is disclosed for providing a range of location dependent information and services to users of wireless devices coupled to the multi-point wireless access network of the current invention.

In an embodiment of the invention a multi-point wireless access network for servicing wireless devices is provided. The multi-point wireless access network includes: wireless access devices, an inventory map and a server. The wireless access points are arrayed in a coordinate system with a known relative relationship to one another. Each of the wireless access points provides communication capabilities for corresponding proximate ones of the wireless devices. The inventory map correlates selected ones of the wireless access points with corresponding inventory located proximate to each of the selected ones of the wireless access points. The server couples to the wireless access points and to the inventory map, and the server correlates each access to the multi-point wireless access network from a corresponding wireless device with the corresponding inventory from the inventory map to provide at least one of location dependant information and location dependant services to the corresponding wireless device.

In an alternate embodiment of the invention a method for providing multi-point wireless access to a plurality of wireless devices is disclosed which comprises the acts of:

positioning a plurality of wireless access points in at least a known relative relationship to one another; and each of the plurality of wireless access points for establishing communications with corresponding proximate ones of the wireless devices;

mapping selected ones of the plurality of wireless access points with corresponding inventory located proximate to each of the selected ones of the plurality of wireless access points;

correlating each access to the multi-point wireless access network from a corresponding wireless device with the corresponding inventory; and providing at least one of location dependant information and location dependant services to the corresponding wireless device responsive to said correlating act.

In still another embodiment of the invention a means for providing multi-point wireless access to a plurality of wireless devices is disclosed which comprises:

means for positioning a plurality of wireless access points in at least a known relative relationship to one another; and each of the plurality of wireless access points for establishing communications with corresponding proximate ones of the wireless devices;

means for mapping selected ones of the plurality of wireless access points with corresponding inventory located proximate to each of the selected ones of the plurality of wireless access points;

means for correlating each access to the multi-point wireless access network from a corresponding wireless device with the corresponding inventory; and means for providing at least one of location dependant information and location dependant services to the corresponding wireless device responsive to said correlating act.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

A method and apparatus is disclosed for providing location dependant information and services to wireless devices. A multi-point access network is disclosed which includes a server coupled to a plurality of access points. Wireless devices within the multi-point network can either request location dependent information and services, or the server can push such location dependent information to the wireless access devices as they migrate through the network formed by the wireless access points. The invention may be practiced with a broad range of wireless standards including: HyperLAN/2 and 802.11a, as well as current 2.4 GHz technologies such as Bluetooth® Telefonaktiebolaget LM Ericsson, Sweden and 802.11b. The operability of the system does not require transparent handoff and handover between the various access points. Complicated or expensive location sensing technologies such as global positioning system (GPS) are not required to determine the location of wireless devices. Instead the access points of the multi-point access network are laid out in a know relative relationship to one another and to inventory items in the surrounding environment. Inventory items for a multi-point access network set up in a building would include: architectural features such as walls, floors and rooms. Inventory items for a multi-point access network set up in a shopping mall, airport or hotel could include in addition to architectural features the commercial entities such as discrete stores, restaurants and service providers located within the mall, airport or hotel for example. Inventory items for a multi-point access network set up in a shopping mall, airport or hotel could include in addition to architectural features, and commercial entities the retail or wholesale items such as books, appliances, clothing and shoes for example in their relative locations to the surrounding access points in the shopping mall, airport, hotel or other environment.

Figure 1:
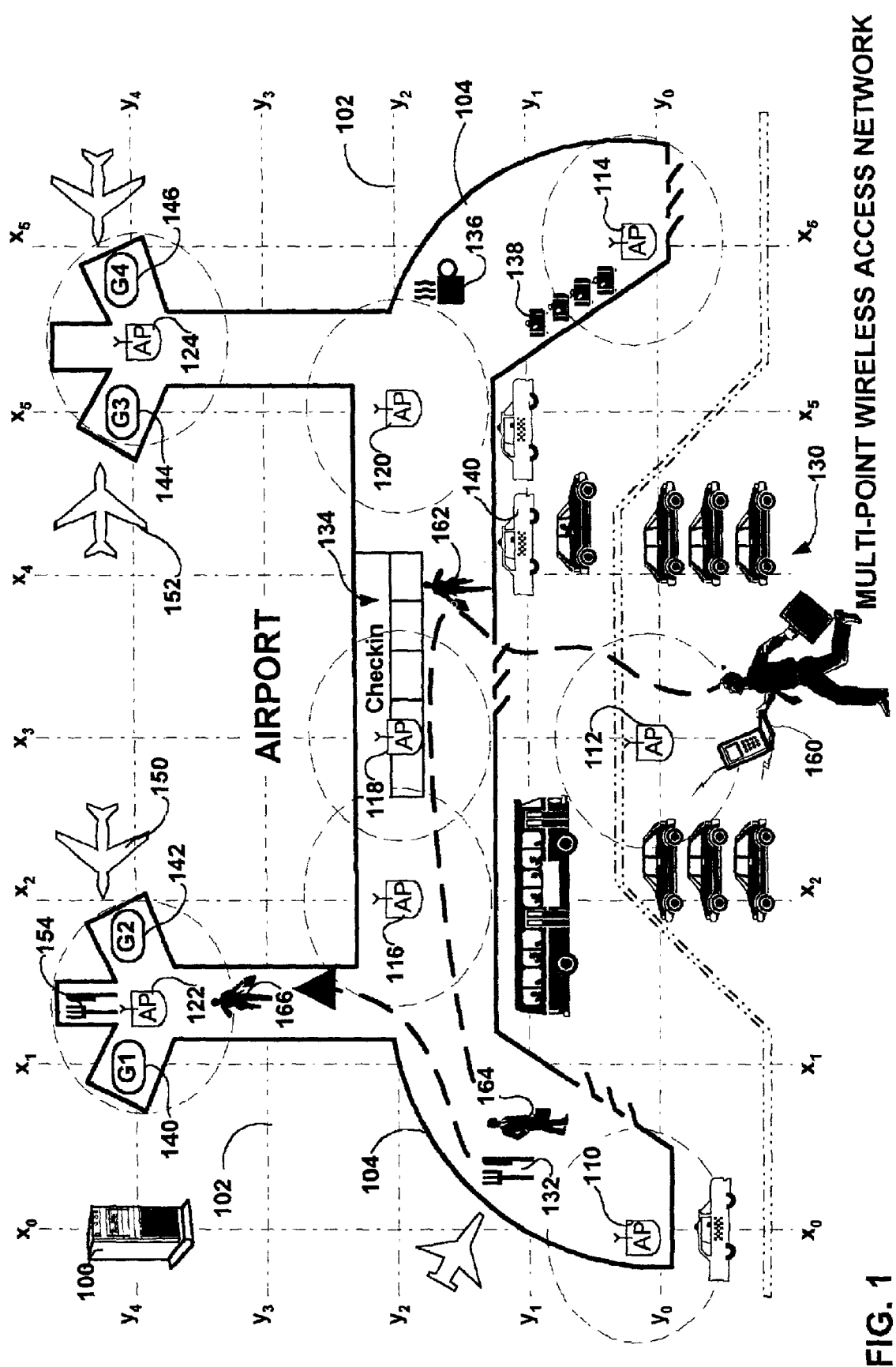
FIG. 1 is a plan view of a multi-point wireless access network for delivering location based information and services implemented at an airport in accordance with an embodiment of the current invention.

FIG. 1 is a plan view of a multi-point wireless access network for delivering location based information and services implemented at an airport in accordance with an embodiment of the current invention. A grid 102 in Cartesian coordinates is shown with access points 110–124 laid out in relation thereto. Superimposed on the grid is shown the corresponding plan view of an airport environment 104. The airport environment is defined by a number of inventory items. Inventory for purposes of this invention includes features of the surrounding environment including: the architecture e.g. rooms and walls and parking lot 130; airport services e.g. checkin counter 134, taxi stand 140, baggage claim 138, departure gates 140–146, planes 150–152; commercial features, e.g. coffee shop 136, and restaurant 132.

Using a wireless device one or more users, e.g. user 160 can make their way through the airport with a minimum of difficulty. Relative locations 160-166 are shown for the user. Initially the user is shown in the parking lot. From this point the user is presented with a series of user interfaces which allow them to locate their position on the associated map, to select a desired item of inventory to which they wish to proceed, e.g. the check-in counter and to be delivered directions to that location. As the user passes from one access point to the next their position is plotted on a map of the environment. Where inventory items are proximate to a given location of the user associated advertisements or promotions may be presented to the user via the handheld wireless device. The operation of the entire multi-point wireless access network is controlled by the server 100 which may be locally or remotely located. The server monitors each access by each wireless device through each access point. The server has maps which correlate the inventory, with the access points, and an access table with records which maintain access histories on each access device. The details of the processes implemented by the server are shown graphically in FIGS. 4A–C and 5A–C and in terms of process flow in FIG. 7. The server allows location specific information and services to be delivered to the user within the airport or other environment within which the system is set up. The overall "airport experience" becomes much more organized and timely for the user. Using the system the user may obtain directions and be notified of promotions, plane delays, flight cancellations, gate changes etc.

Figure 2:
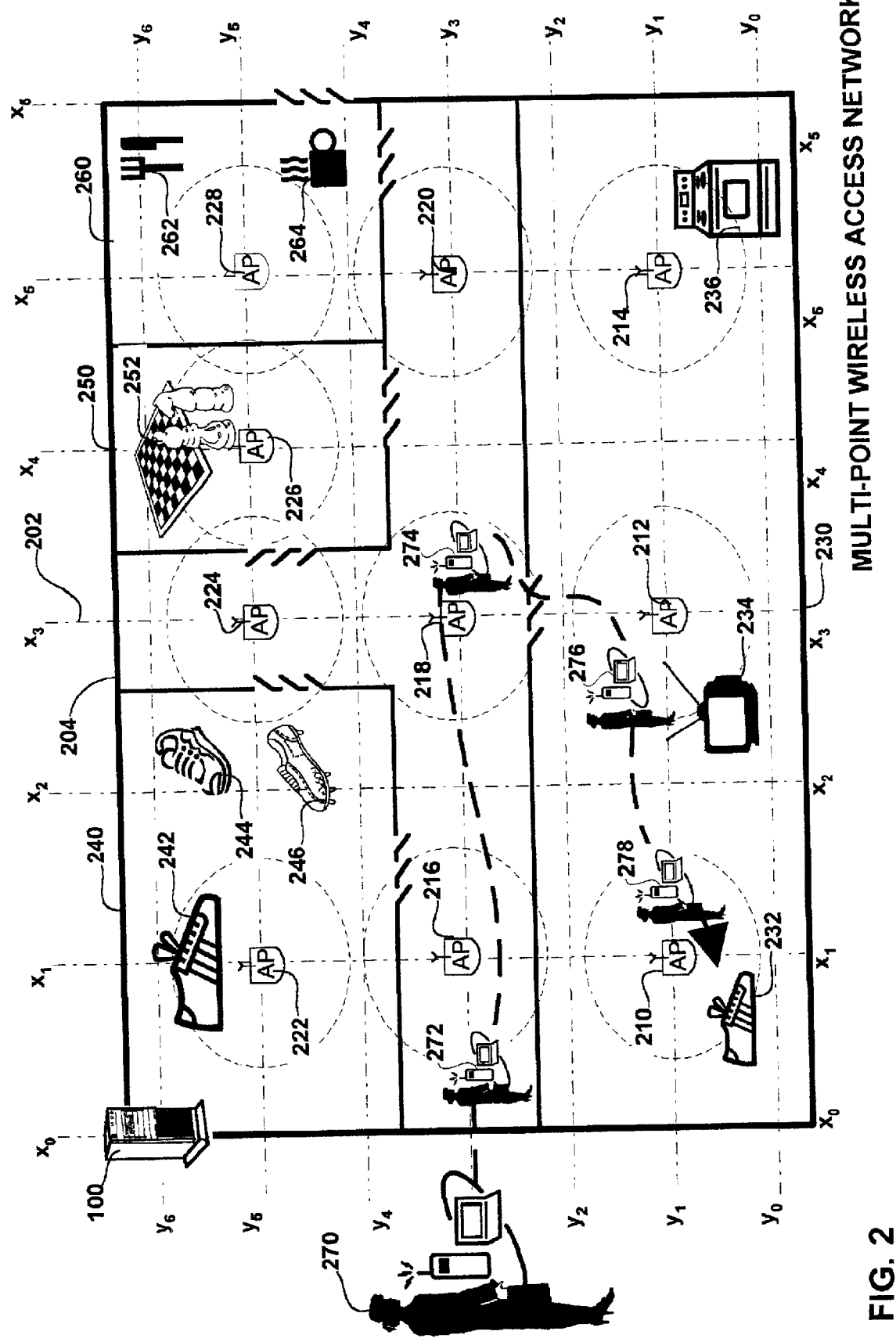
FIG. 2 is a plan view of a multi-point wireless access network for delivering location based information and services implemented at a shopping mall in accordance with an embodiment of the current invention.

FIG. 2 is a plan view of a multi-point wireless access network for delivering location based information and services implemented at a shopping mall in accordance with an embodiment of the current invention. The grid 202 in Cartesian or other coordinate system is shown. Each of the access points 210–228 is located relative to one another in coordinates stored in server 100 and specifically in the wireless access point table 304 (See FIG. 6). A floor plan 204 for a shopping mall is shown. The mall includes a number of architectural inventory items, e.g. shoe store 240, game store 250, latte bar 260, and super-store 230. Within all stores corresponding items of inventory are shown, also in relation to the grid coordinate system. The coordinates for these inventory items, e.g. retail goods and/or services are also stored in the server 100 and specifically in the inventory table 306 thereof (See FIG. 6). For the superstore inventory includes: shoes 232, televisions 234 and appliances 236. For the shoe store inventory includes: various types of footwear 242–246. For the game store the location of a chess game 252 is shown. For the latte bar 260 inventory includes the coffee services 264 and the fast meal services 262.

A shopper 270 is shown at various locations 272–278 throughout the mall and specifically the superstore. Upon entering the mall the shopper used her wireless access device to communicate with the server 100 through a proximate one of the access points. With graphical interfaces such as those shown in FIGS. 5A–C the server displays location specific information and services to the shopper. The first of these is a menu listing the stores in the mall and their associated inventory. Once the user selects an item of inventory from the menu they are given a map with a destination vector to the desired inventory item. As they progress through the mall to the inventory item their source vector(s) are displayed showing their path through the floor plan. As the user access passes from one assess point to the next they may be presented with promotional or advertising related to the surrounding inventory. Upon passing the TV's 234 the user would be prompted with a display of "discounted TV's" or other inventory related promotions. The shopping experience of the user who accesses the multi-point wireless access network provided by the mall is more focussed, and relaxed.

Figure 3:
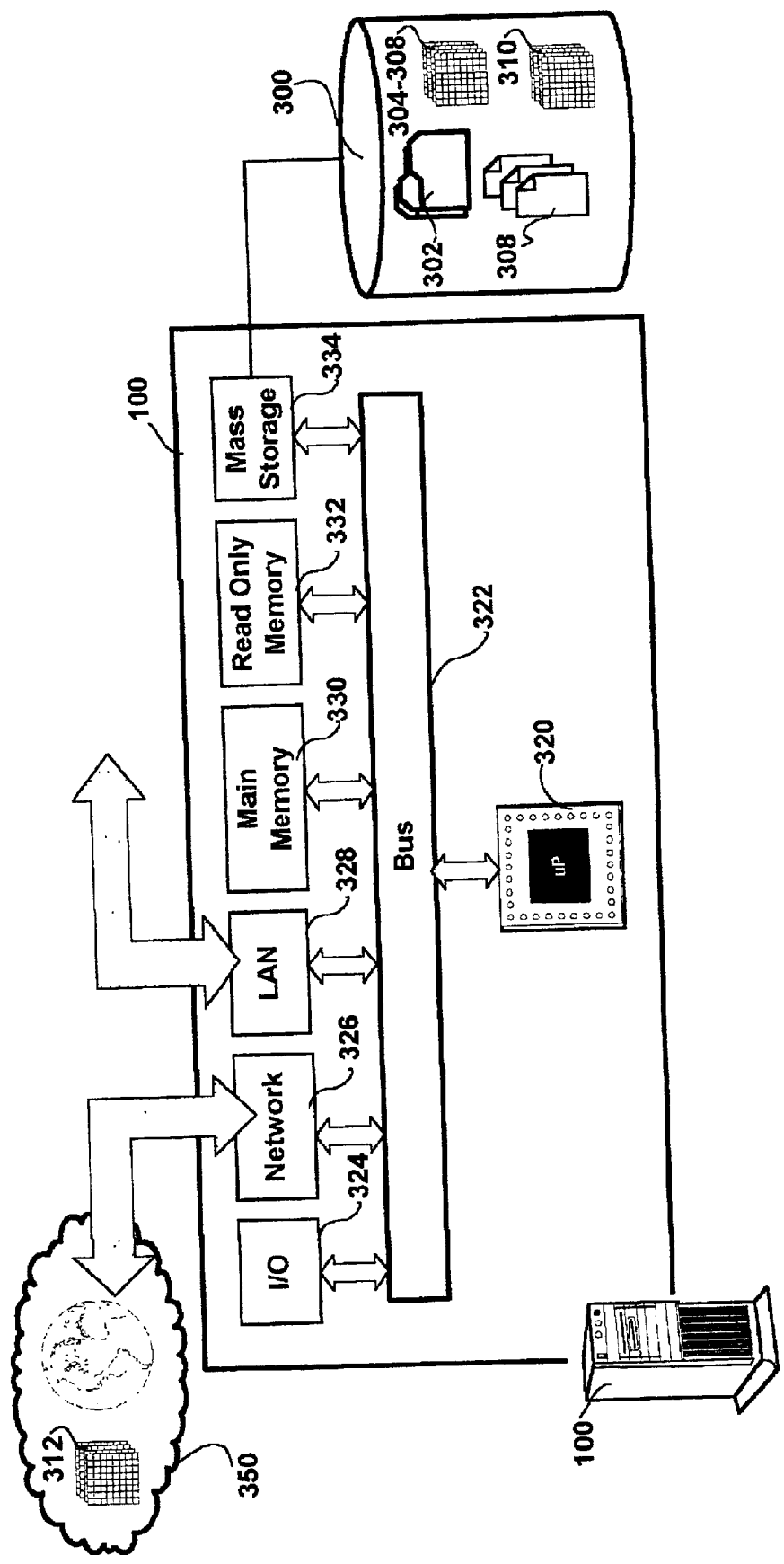
FIG. 3 is a hardware block diagram of a server for delivering location based information and services to wireless access devices coupled to the multi-point wireless access network in accordance with an embodiment of the invention.

FIG. 3 is a hardware block diagram of a server for delivering location based information and services to wireless access devices coupled to the multi-point wireless access network in accordance with an embodiment of the invention. The server 100 includes at least one processor 320 for processing information. The processor couples via a bus 322 with Input/Output (I/O) devices 324, network device 326, local area network (LAN) device 328, main and read only memories 330–332 and mass storage device 334. The I/O device 324 may include keyboard and display. The network device 326, wired or wireless, couples the server with the Internet 350, or other wide area network (WAN) or local area network (LAN). The LAN device couples to the multiple wireless access points for the given environment, e.g. airport, mall, hotel, hospital, business etc. The main memory 300 stores information and instructions for the processor. The read only memory 332 stores information and boot instructions for the server. The mass storage device 334, such as magnetic disk and associated disk drive, couples with the bus 322 for storing information and instructions on the storage medium 300. The storage medium contains: program code 302, tables 304–308 for mapping access points and inventory and wireless devices, graphical user interfaces 308 for display on a wireless device and may also include a table of preferences 310 for registered users and their associated wireless devices in any one of a number of environments. Any of the above mentioned data structures may alternately be found on the Internet 350. Additionally, $3^{rd}$ party tables of user preferences 312 may also be found on the Internet.

Figure 4A:
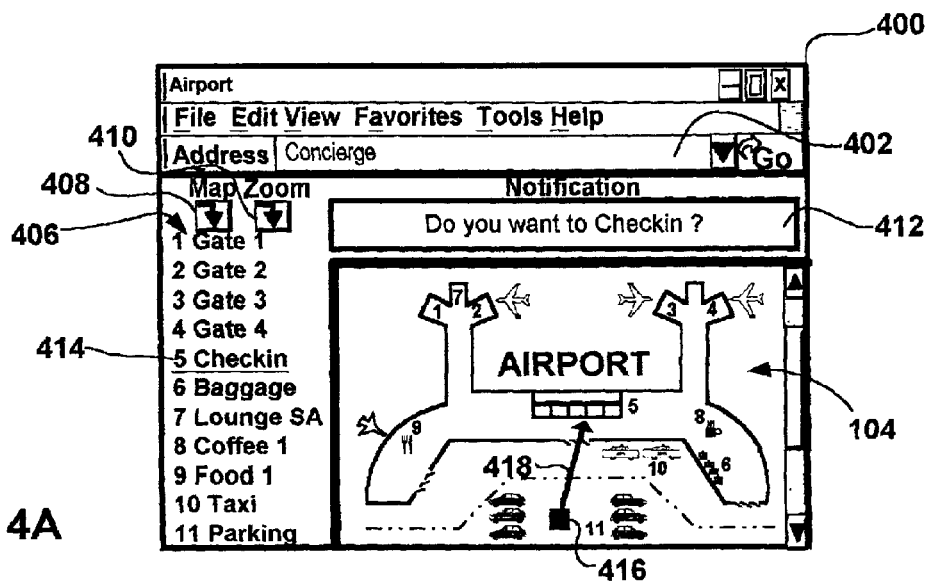
FIGS. 4A–C are representative graphical user interfaces associated with providing location dependent information and services to wireless access devices coupled to the multi-point wireless access network shown in FIG. 1.
Figure 4B:
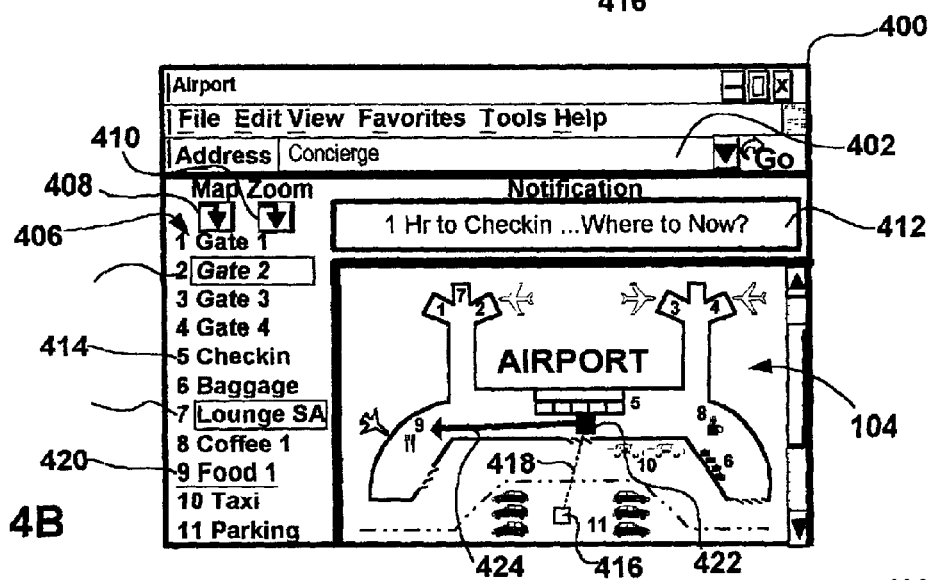
Figure 4C:
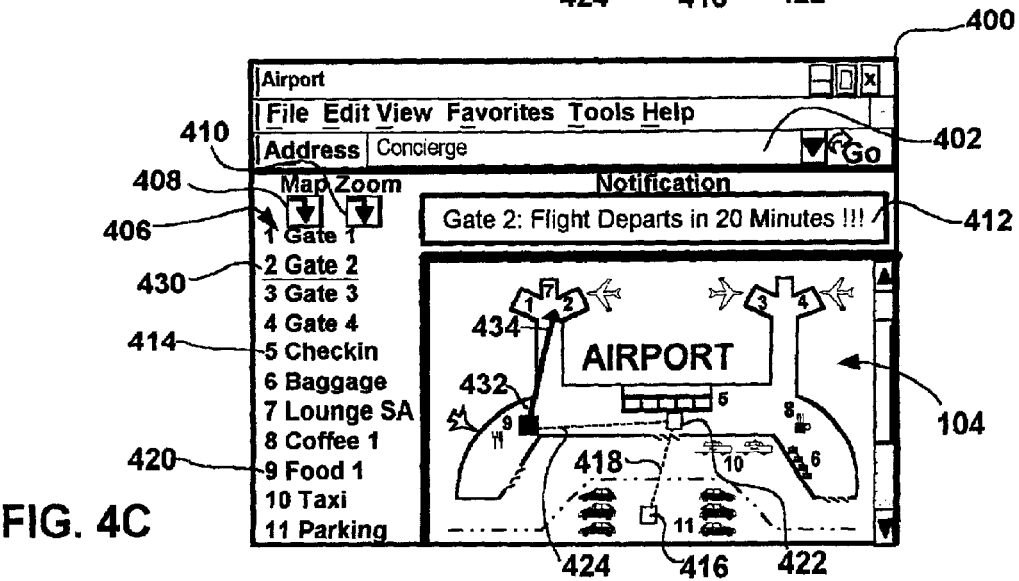

FIGS. 4A–C are representative graphical user interfaces (GUIs) associated with providing location dependent information and services to wireless access devices coupled to the multi-point wireless access network shown in FIG. 1. In the embodiments shown in FIGS. 4A–C the user 160 (See FIG. 1) is presented with graphical interfaces stored on server 100 in files 308 (See FIG. 3). The browser 400 includes the address box 402 and a display window for displaying a menu 406, a map of the airport 104, a notification box 412, and icons 408–410 for regenerating the map and zooming the map view respectively. The sequence of GUIs shown in FIGS. 4A–C follows the users path from parking lot, to checkin, restaurant and to departure gate as shown in FIG. 1. Upon arrival at the parking lot 130 (See FIG. 1) the server provides the map 104 to the user displaying their current location. When the user selects from the airport inventory menu 406 the checkin 414, the server calculates a destination vector 418 pointing from the users current location 416 toward the checkin counter. The server also detects that this access is the first of this session and therefore "Pushes" a greeting to the user via the notification window 412.

Next in FIG. 4B the user has checked in. The airport server is coupled to the multipoint access server 100 and from this coupling the record for the wireless device maintained by the server may be updated with the flight information for the user including: airline, departure time, and gate. (See Field 628, Table 308 FIG. 6). The update of the flight information results in the server event (See FIG. 7 processes 738) results in the server 100 sending a notification to the user via the notification window 412 that there is "1 hour to checkin". The user then decides there is sufficient time before flight for a meal and selects inventory item "Food" 420 from the inventory menu 406 of their wireless device. The server generates a new destination vector 424 from the users last location 422 and converts prior path of the user from the parking lot to a source vector 418 as indicated by the dashed line.

Finally, in FIG. 4C the user is notified by an event pushed to the wireless device by the server and based on the up to date departure time that the user has 20 minutes till the flight departs. This information is displayed on the notification window 412. The user or the server then selects the departure gate inventory item 430 and the server responsive thereto generates a destination vector 434 from the users current location 432 to their destination departure gate.

Figure 5A:
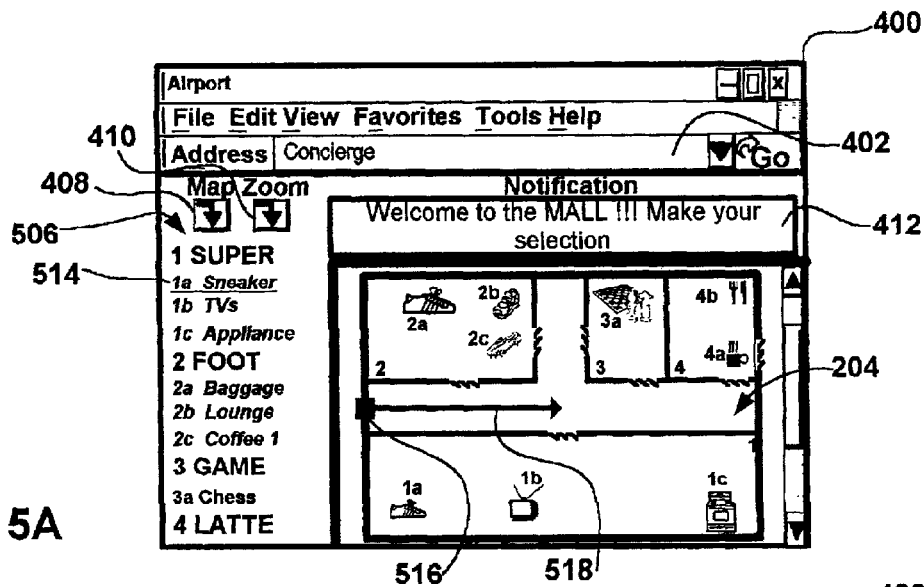
FIGS. 5A–C are representative graphical user interfaces associated with providing location dependent information and services to wireless access devices coupled to the multi-point wireless access network shown in FIG. 2.
Figure 5B:
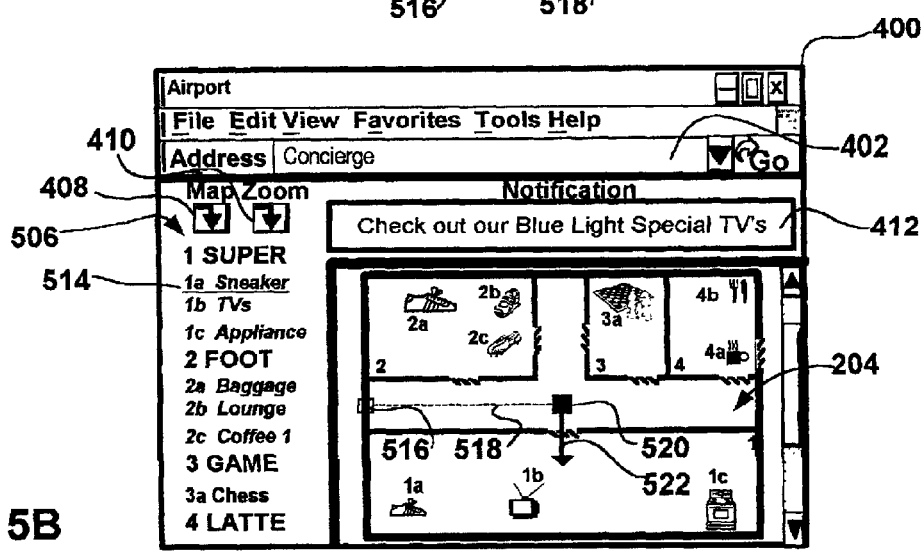
Figure 5C:
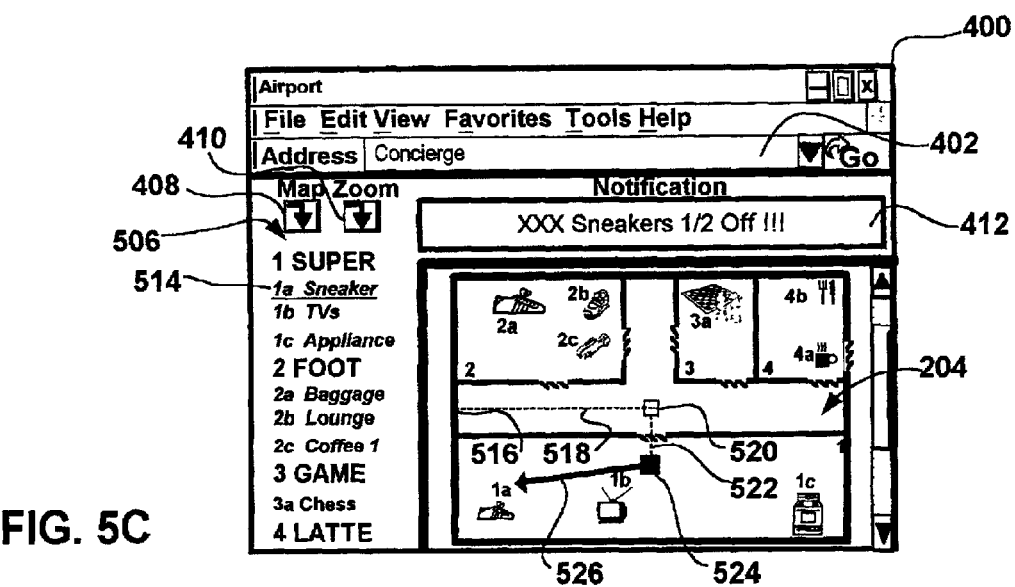

FIGS. 5A–C are representative graphical user interfaces associated with providing location dependent information and services to wireless access devices coupled to the multi-point wireless access network shown in FIG. 2. FIGS. 5A–C show a graphical interface substantially similar to that shown in FIGS. 4A–C. The map 204 that is displayed is a map of the mall shown in FIG. 2. The menu 506 is the menu of inventory items relevant to the mall environment. The consumer 270 (See FIG. 2) selects the sneaker inventory item 514 from menu 506 and is directed via corresponding destination vectors 518, 522, and 526 from their original location 516 through subsequent locations 520 and 524 to their final destination the sneaker inventory within superstore 230 shown in FIG. 2 and on the associated map 204 displayed on the user's wireless device. As the user enters the mall a session is established and the server 100 pushes a greeting to the user in notification window 412 of the browser 400. As the user passes each access point the proximate inventory items are determined by the server and advertising or promotions related thereto are displayed to the user in the notification window. As the user approaches the sneaker inventory they are informed in the notification window of a brand of sneakers which is priced at a 50% discount. All this promotional or advertising information is contained in each inventory record in the inventory table 306 (See FIG. 6).

Figure 6:
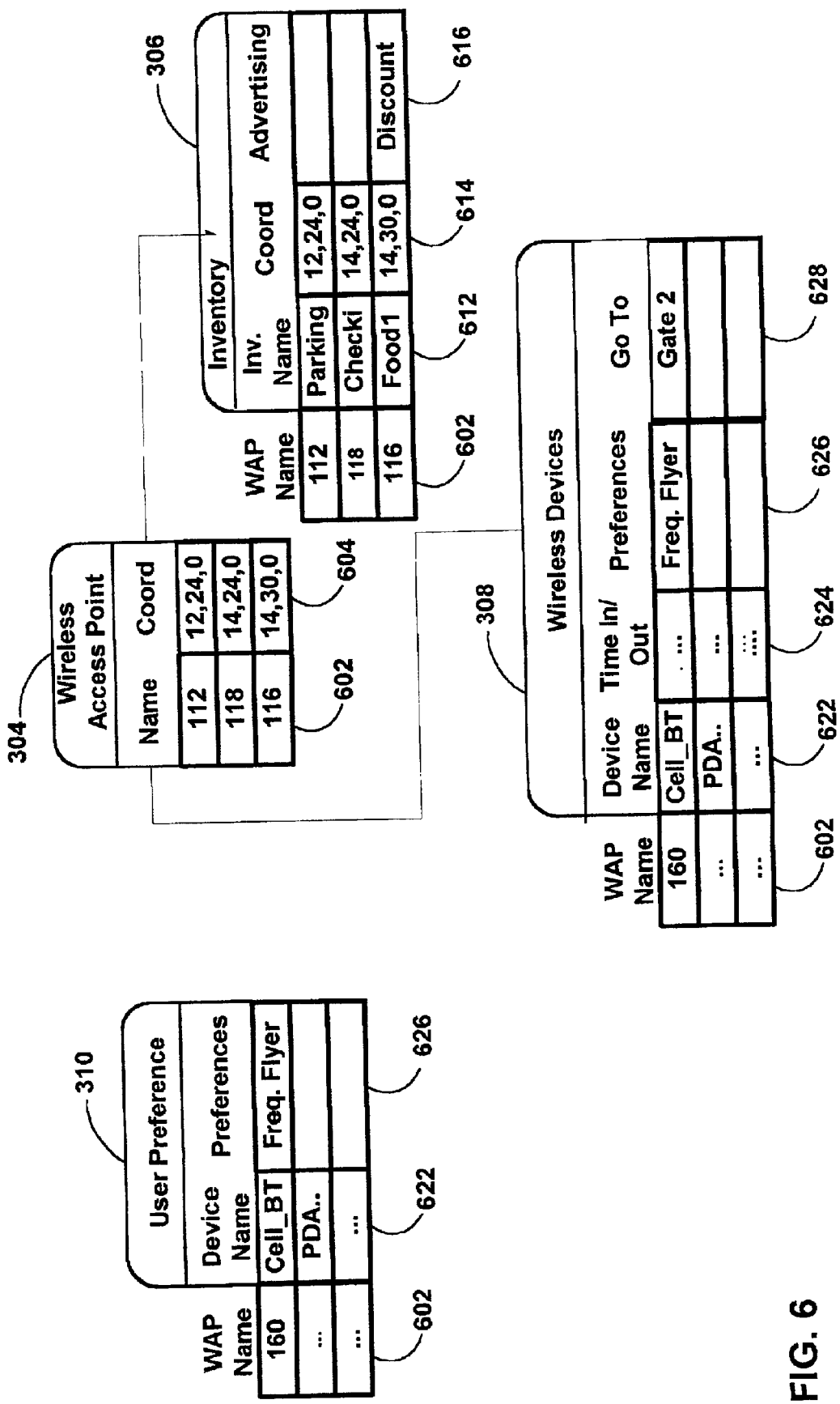
FIG. 6 shows data structures associated with mapping items of inventory with corresponding access points and with wireless access devices coupled to a corresponding wireless access point.

FIG. 6 shows data structures associated with mapping items of inventory with corresponding access points and with wireless access devices coupled to a corresponding wireless access point. The wireless access point table 304, the inventory table 306, the wireless device access table 308 and the user preference table 310 are shown. The wireless access point table 304 lists for each access point the associated name and coordinates in fields 602 and 604 respectively. The inventory table 306 lists for each wireless access point the associated inventory item, coordinates of the inventory item and any promotional or advertising related to the inventory item in fields 602, 612, 614 and 616 respectively. The wireless device access table 308 lists for each wireless access device that has accessed the network the corresponding wireless access point (Field 602 ), the name of the wireless access device (Field 622, the time of entering and leaving the access point (Field 624 ). Additionally user preferences for registered users may be listed in field 626. The additional field 628 is for the "GO-TO" inventory location or name selected by the user from the menu. In an airport scenario where this field contains Flight #, Departure Gate and Time, this field may be updated by a $3^{rd}$ party server to take account of any departure delays or gate changes. Such information can be used to update the information displayed to the user on the associated device. These tables collectively map the relative or absolute locations of each of the access points to corresponding proximate inventory locations to enable the sort of user interactions with the environment shown in FIGS. 1–2 and 4A–C and 5A–C. Finally, user preference table 310 contains for each wireless device, the device name, and user preferences in fields 602, 622 and 626 respectively.

Mapping can be accomplished by other means as well. In an embodiment of the invention in which a number of discrete locations, e.g. airports, hotels, malls, etc. are handled on a single server a directory structure may be adopted for the corresponding inventory features of each discrete location. This tree structure much like the traditional file directories on personal computers can contain a number of root directories for airports, malls and hotels for example. Within each directory environments may be broken down into sub directories by region. Within each sub-directory further sub-sub-directories may be provided for containing the associated inventory for each environment. Collectively these tree structures form a map which correlates many environments with associated inventory and within each environment the location of access points with respect to the associated inventory.

Figure 7:
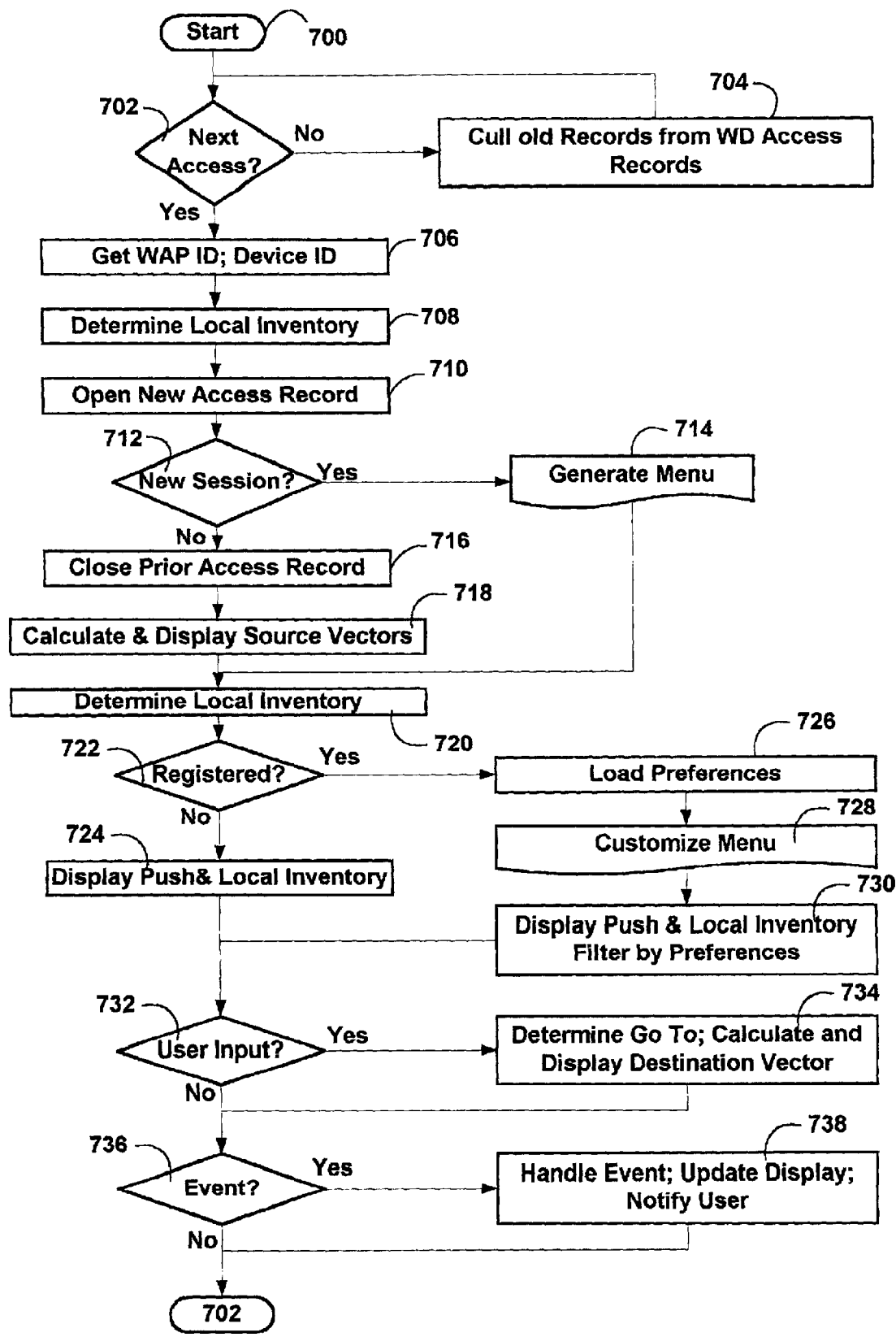
FIG. 7 is a process flow diagram showing processes implemented on the server shown in FIGS. 1–3 for delivering location dependent information and services to wireless access devices.

FIG. 7 is a process flow diagram showing processes implemented on the server shown in FIGS. 1–3 for delivering location dependent information and services to wireless access devices. Processing begins at start block 700 in which the server and associated access points are initialised. Initialisation includes: creation or generation of the wireless access point mapping table 304, the inventory mapping table 306, and may additionally include obtaining access to a user preference table 310, for registered users of the multi-point wireless access network. Next in decision process 702 a determination is made as to whether a next access by a wireless device via a corresponding access point is in progress. If an access is in progress control is passed to process 706. If no access is in progress then control passes to process 704 in which a database sort is conducted on the wireless device access records in wireless device access table 308. Based on the recency of access to the multi-point network those access device records that are stale may be deleted from the table 308.

In process 706 the identifiers for both the wireless device as well as the access point by which it is accessing the multi-point network are obtained. Then in process 708 the access point ID is used to locate matching records in the inventory table. These are the inventory items proximate to the corresponding access point via which access to the multi-point network is being made by the associated wireless device. Next in process 710 a new access record is opened in table 308 including fields for wireless access point name 602, for wireless device name 622, for time of record opening 624. Additionally, any user preferences found in user preference table 310 may be written into field 626 in the record. Then in decision process 712 a determination is made as to whether the new access represents the first access record for the wireless device. This determination is made based on a query of the table 308 to see if the corresponding wireless device is listed in any other records. If not then the access represents a new session and control is passed to process 714 in which a menu is generated for and provided to the wireless device. The menu (See FIGS. 5A–C, menu 506 or FIGS. 4A–C, menu 406 is generated from the entries in the inventory table 306, subsequent to which control passes to process 720. If alternately in decision process 716 a determination is made that a new session is not taking place then control passes to process 716 in which the prior access record for the associated wireless device through another access point is closed by adding a "time-out" entry into field 624 of the corresponding record. Then in process 718 the source vector is calculated for this access to the associated wireless device. The source vector is obtained by sorting the access table 308 and filtering to locate prior accesses by the associated wireless device. These are ordered by time out in descending order. Then the coordinates for each successive access point of the associated wireless device are determined from wireless access table 304. Source vectors from each successive access point to the next access point are determined in Cartesian or polar or other coordinate system and converted for presentment to the associated wireless device. Presentment may be visually as shown in FIGS. 4A–C and 5A–C or textually or audibly depending on the complexity of the system. Control is then passed to process 720. In process 720 the inventory from the inventory table 306 which is proximate to the associated access point is determined. Then control passes to decision process 722.

In decision process 722 a determination is made on the basis of a registration table (not shown) for the multi-point network as to whether the associated device or related user is registered with the provider of the server. If so then in process 726 their preferences are loaded from preference table 310. Then in process 728 the menu presented to the user via the wireless device is customized as called for in the preferences. For users in an airport who are frequent flyers customisation would include highlighting the menu item "Lounge SA" to indicate to the user where the lounge associated with their preferred airline is located in the airport. Then in process 730 any advertising or promotional matter contained in field 616 of the relevant inventory records, i.e. those proximate the access point may be displayed to the user in the notification window 412 shown in FIGS. 4AC–and 5A–C. Where user preferences so dictate this push of advertisements or promotions may be filtered to take account of the registered users preferences. Then control passes to decision process 732. If alternately in decision process 722 a determination is made that the user is not registered then control passes to process 724 in which advertising or promotions for the proximate inventory is pushed to the wireless device without filtering for preferences.

Next, in decision process 732 a determination is made as to whether there has been user input, e.g. a selection of an inventory item from menu 406 in FIGS. 4A–C or menu 506 in FIGS. 5A–C. If there has then control passes to process 734. In process 734 the coordinates of the selected inventory item are determined using field 614 of the inventory table 306. Then the coordinates of the current access point are determined from access table 304 and a destination vector is calculated and presented to the wireless device for subsequent display to the user. Next control is passed to decision process 736, which is the same process reached upon a negative determination in decision process 732. In decision process 736 a determination is made as to whether any events need to be processed. If so control passes to process 738 in which the event is handled, the user is notified. Then control returns to process 702 which is the same process reached upon a negative determination in decision process 736.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A wireless access network (WAN) for servicing wireless devices, and the WAN comprising:

wireless access points (WAP) each having locations expressed in a coordinate system; and each of the WAP configured to establish communications with proximate ones of the wireless devices; and a server coupled to the WAP and the server configured to maintain access records correlating times of access by each wireless device with associated WAPs providing said access, and the server further configured to deliver to each wireless device, via a proximate WAP, a map including an overlay of a prior path of the wireless device through the WAN and the prior path determined by sorting the access records for each wireless device by a time of access to a corresponding WAP and generating the prior path as a sequence of vectors with coordinates corresponding with the locations of each successive WAP in the sorted access records.

2. The server of claim 1, further configured to convert the prior path for at least one of visual, textual or audible presentment on the wireless device.

3. The WAN of claim 1, further comprising:

inventory records correlating inventory items with an associated location in the coordinate system; and the server further configured to deliver to the wireless device, via the proximate WAP, a destination path of the corresponding wireless access device to a corresponding item of inventory based on the location of the proximate WAP and the location of the corresponding item of inventory in the associated inventory record.

4. The server of claim 1, further configured to deliver the destination path to the wireless device responsive to at least one of a request from the wireless device for an item of inventory and a selection by the server of an item of inventory proximate to the proximate WAP as indicated by the access and inventory records.

5. A method for providing a multi-point wireless access network (WAN) to wireless devices, comprising:

providing wireless access points (WAP) each having locations identified in a coordinate system;

maintaining access records correlating times of access by each wireless device with associated WAPs providing said access; and delivering to each wireless device, via a proximate WAP, a map including an overlay of a prior path of the wireless device through the WAN and the prior path determined by sorting the access records for each wireless device by a time of access to a corresponding WAP and generating the prior path as a sequence of vectors with coordinates corresponding with the locations of each successive WAP in the sorted access records.

6. The method of claim 5, wherein the delivering act further comprises:

converting the prior path for at least one of visual, textual or audible presentment on the wireless device.

7. The method of claim 5, further comprising:

maintaining inventory records correlating inventory items with an associated location in the coordinate system; and delivering to the wireless device a destination path of the corresponding wireless access device to the corresponding item of inventory based on the location of the wireless device in the associated access record and the location of the corresponding item of inventory in the associated inventory record.

8. The method of claim 5, wherein the second delivering act further comprises:

delivering the destination path to the wireless device responsive to at least one of the acts of:

receiving a request from the wireless device for an item of inventory; and selecting an item of inventory proximate to the proximate WAP as indicated by the access and inventory records.

* * * * *